United States Patent

Kuiri

[11] Patent Number: 5,411,319
[45] Date of Patent: May 2, 1995

[54] VEHICLE SEAT

[75] Inventor: Teijo Kuiri, Luopioinen, Finland

[73] Assignee: Hameen Autosisustamo Oy, Luopioinen, Finland

[21] Appl. No.: 130,184

[22] Filed: Oct. 1, 1993

[51] Int. Cl.⁶ .............................................. B60R 22/22
[52] U.S. Cl. .................... 297/483; 297/468; 297/473
[58] Field of Search ............... 297/468, 473, 474, 483, 297/484; 280/801.1, 803

[56] References Cited

U.S. PATENT DOCUMENTS

| | | | |
|---|---|---|---|
| 3,606,456 | 9/1971 | Cazabon | 297/474 |
| 4,940,285 | 7/1990 | Suzuki et al. | 297/473 |
| 5,022,677 | 6/1991 | Barbiero | 297/483 X |
| 5,120,103 | 6/1992 | Kave | 297/473 X |
| 5,123,673 | 6/1992 | Tame | |

FOREIGN PATENT DOCUMENTS 3613830 10/1981 Germany .
3743012  7/1988 Germany .................. 280/801.1

Primary Examiner—Peter R. Brown
Attorney, Agent, or Firm—Pollock, Vande Sande & Priddy

[57] ABSTRACT

Vehicle seat is movably mounted on a slide rail and having attachment points for a safety belt comprising a lap belt portion and a shoulder belt portion arranged in the seat so that the attachment points of the lap belt are on both sides of the seat and a retractor roll of the safety belt is attached to the frame of a horizontal seat part. The shoulder belt of the safety belt extends from the roll along a backrest upwards and continues via a guide at the upper end of the backrest to the front of the backrest. The retractor roll has a support piece projecting below a part of the slide rail so that it can move in the longitudinal direction of the slide rail as the seat moves back and forth, but it is prevented from being lifted upwards.

8 Claims, 2 Drawing Sheets

VEHICLE SEAT

BACKGROUND OF THE INVENTION

The present Invention relates to a vehicle seat movable back and forth on a slide rail, the seat comprising the attachment points for a safety belt comprising a lap belt portion and a shoulder belt portion so that the attachment points of the lap belt are positioned on both sides of the seat and the retractor roll of the safety belt is attached to the frame of a horizontal seat part, the shoulder belt of the safety belt extending from the retractor roll and along a backrest upwards and continuing via a guide at the upper end of the backrest to the front of the backrest.

Safety belts attached directly to the vehicle seat are known for example from U.S. Pat. No. 5,123,673, incorporated herein by reference. The shoulder belt emerges from a retractor roll attached to the upper section of the backrest frame. Further, German Offenlegungsschrift 3613830 shows a vehicle seat where the retractor roll is placed in the frame of the horizontal seat portion, for example on the upper slide rail which is part of the structure of the horizontal seat portion. This allows to transmit forces acting on the shoulder belt to the rigid seat portion frame structure rather than to the backrest.

Reference is also made to another U.S. Patent application with the title "Safety belt system for a vehicle seat", filed by the Applicant simultaneously with the present application and also incorporated herein by reference.

The roll wherefrom the shoulder belt emerges should be secured to the seat to afford maximum stability in case of collisions or other sudden stops where considerable tensile forces act on the roll. The structure of the seat is often such that the roll can not be placed on the upper slide rail as in German OS 3613830. Further, these slide rails are often of an insufficiently durable construction.

SUMMARY OF THE INVENTION

Accordingly, it is an object of the present invention to provide a vehicle seat wherein the safety belt attached directly to the seat has improved stability and strength. The retractor roll is attached to the frame of the horizontal seat portion which includes also a part sliding along the slide rail. A support piece is fastened to the retractor roll body, the support piece projecting under a part of said slide rail so as to move in the longitudinal direction of the slide rail as the seat moves back and forth, but it will be prevented by this part of the slide rail from being lifted upwards.

In case of tensile forces acting upwards the support piece acts as safety means keeping the retractor roll in place even if the connection between the seat portion frame and the roll is weakened.

Further objects, features and advantages of the invention will become apparent from a consideration of the following description and the appended claims when taken in connection with accompanying drawings.

DETAILED DESCRIPTION OF THE PREFERRED EMBODIMENT

Figure 1:
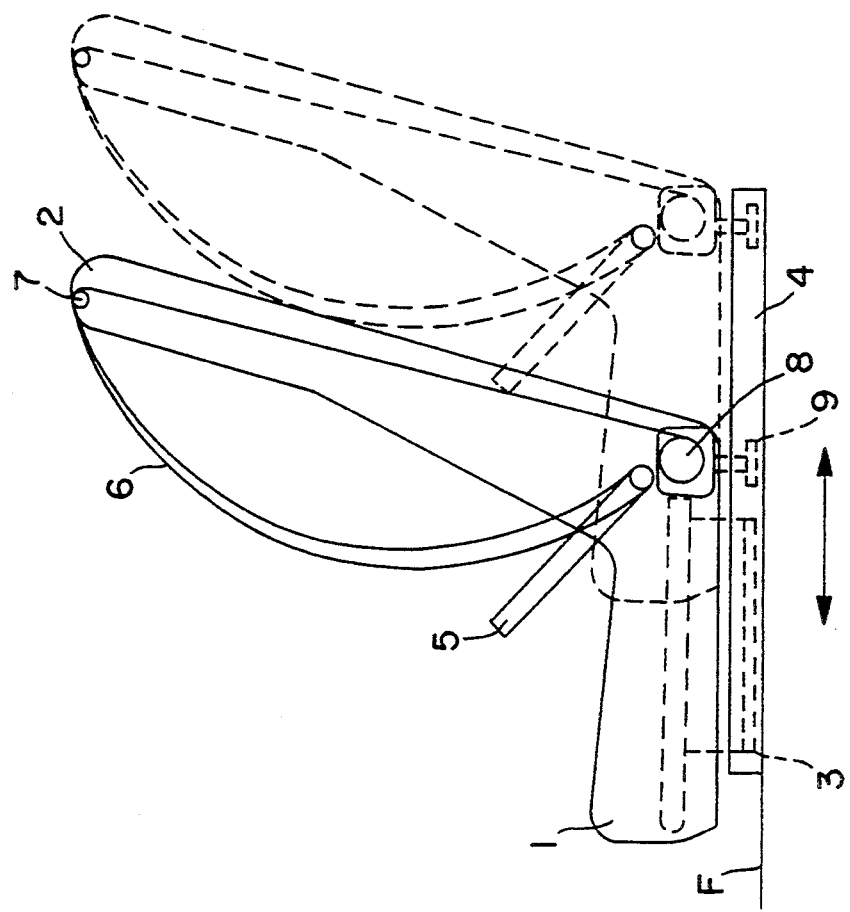
FIG. 1 is a side elevational view of the vehicle seat of the invention.

A vehicle seat shown in FIG. 1 comprises a horizontal seat portion 1, sometimes referred to as a cushion part, and a backrest 2 extending upwardly at the rear of the seat portion 1 and inclinable to different positions with respect to seat portion 1. The seat is movable back and forth on sliding means 3 which are attached to the seat portion frame shown by broken lines. The sliding means guide the seat along a slide rail 4 attached to the vehicle floor F. FIG. 1 shows the seat in its two different positions in the longitudinal direction of the slide rail 4.

The number of the slide rails 4 is usually two and they extend parallelly in the longitudinal direction of the vehicle and they are designed to receive each the sliding means 3 attached to the seat portion frame.

Figure 2:
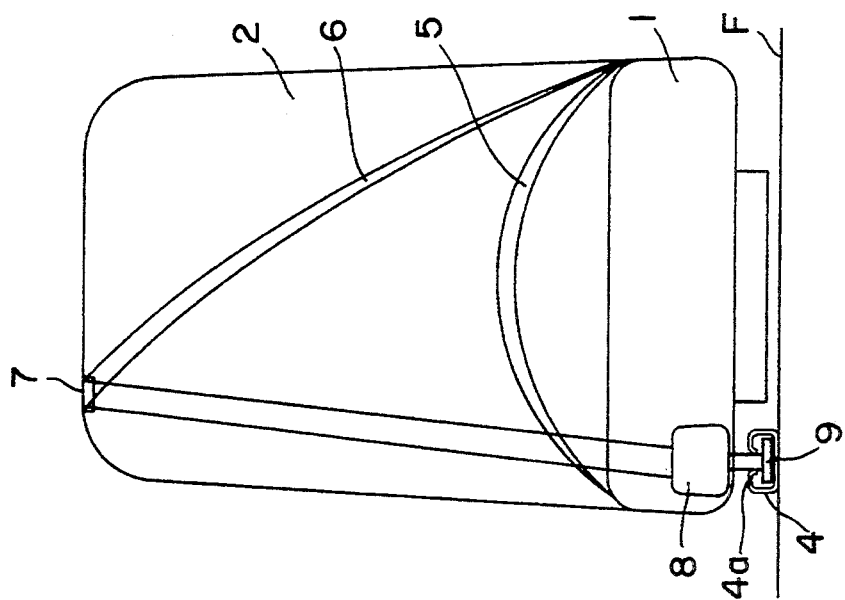
FIG. 2 is a front elevational view of the seat of FIG. 1.

FIG. 1 further illustrates a safety belt whose attachment points are in the seat. As best shown in FIG. 2, the stationary end of the lap belt 5 is on one side of the seat, for instance attached to the side section of the frame of the seat portion 1, and the buckle receiving the clasp between the lap belt 5 and shoulder belt 6 is on the other side and may also be attached to the other side section of the seat portion frame. The shoulder belt 6 extends from the clasp upwards through a suitable guide 7 at the upper end of the backrest 2 and after the guide 7 downwards to a retractor roll 8. The shoulder belt 6 between the retractor roll 8 and the guide 7 is preferably concealed within the structure of the backrest 2. The guide 7 can be of any construction having low friction with the belt, such as a roller or the like.

A support piece 9 is attached to the box-like body of the retractor roll 8. The support piece 9 projects downwards to the slide rail 4 underneath the seat portion 1. The free end of the support piece 9 is so shaped that it will lie below a part 4a of the guide rail 4. In this case the support piece 9 has the shape of an inverted T whose horizontal end part extends below the inwardly directed flanges of the slide rail 4. These flanges serve as the parts 4a limiting the movement of the supporting piece 9 upwards. The free edges of the flanges define therebetween a slot, through which both the sliding means 3 guiding the seat and the support piece 9 can project into the slide rail 4. It should be, however, appreciated that any other rail constructions that have a part securing the supporting piece against upwards movement are applicable in this invention.

Figure 3:
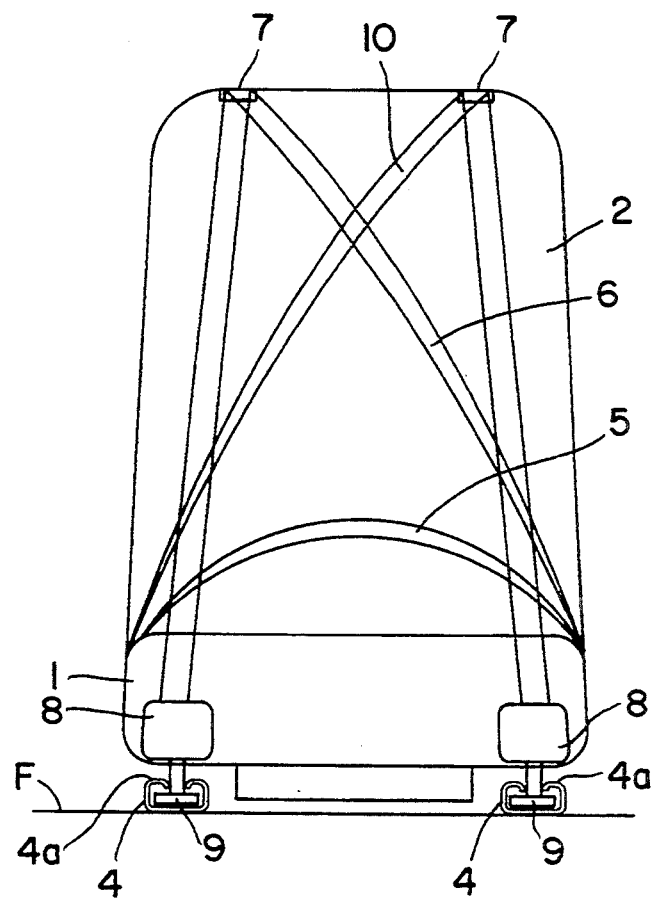
FIG. 3 is a front elevational view of the seat according to another embodiment of the invention.

FIG. 3 shows the safety arrangement which has the same principle as in FIGS. 1 and 2. The basic difference is that the seat has an additional shoulder belt 10 extending from a retractor roll 8 on the opposite side of the seat portion and being attached by means of a clasp and buckle assembly on the same side of the seat portion 1 as the stationary attachment point of the lap belt 5. The additional shoulder belt 10 supplements the safety belt to form a so-called four point belt system shown for example in U.S. Pat. No 5,123,673. The retractor roll 8 of the additional shoulder belt 10 has a similar support piece 9 projecting into a slide rail 4, which is parallel to the other slide rail 4. This system affords a symmetrical construction as well as better distribution of tensile forces to the frame structure of the seat portion 1 and to the slide rails 4. The body of the retractor roll 8 can be attached to the seat portion 1 by any suitable means, for example by bolts, screws or welding. Further, the separate support piece 9 can be attached to the body of the retractor roll 8 by any suitable means, such as by welding, by bolts or by screws. The support piece 9 should be attached to the roll in a manner that although the connection between the seat portion and the retractor roll body is weakened, the support piece is still firmly held+by the retractor roll body. The body of the retractor roll and the support piece 9 can for example be assembled together to form a single unit, which then can be attached to the seat portion 1.

I claim:

1. A vehicle seat having a horizontal seat part and a backrest, and which is mounted movably on a slide rail and having attachment points for a safety belt comprising a lap belt portion and a shoulder belt portion arranged in the seat such that the attachment points of the lap belt portion are positioned on both sides of the seat and a retractor roll of the safety belt is attached to a frame of said horizontal seat part, the shoulder belt portion of the safety belt extending from the retractor roll and along said backrest upwards and continuing via a guide at an upper end of the backrest to the front of the backrest, said retractor roll comprising a support piece projecting below a part of said slide rail to cause the inter-engagement of the support piece and the slide rail so that the support piece can move in the longitudinal direction of the slide rail as the seat moves back and forth, but it is prevented from being lifted upwards.

2. A vehicle seat as claimed in claim 1, wherein the support piece is situated in the cross section of the slide rail at the same location as the sliding means attached to the seat portion and guiding the sliding movement of the seat.

3. A vehicle seat as claimed in claim 2, wherein the slide rail comprises a slot open upwards and bordered by two flanges directed towards each other, the support piece projecting into the slide rail between said flanges.

4. A vehicle seat as claimed in claim 3, wherein the seat is equipped with a four point safety belt and comprises a further retractor roll for a second shoulder belt additional to a three point belt, said further retractor roll of the second shoulder belt being also attached to the frame of the horizontal seat part and having a support piece attached thereto, the retractor roll and the further retractor roll being attached on the opposite sides of the seat portion, both rolls being situated above respective parallel slide rails with the support pieces projecting into their respective parallel slide rails between said flanges.

5. A vehicle seat as claimed in claim 2, wherein the seat is equipped with a four point safety belt and comprises a further retractor roll for a second shoulder belt, said further retractor roll of the second shoulder belt being also attached to the frame of the horizontal seat part and having a support piece attached thereto, the retractor roll and the further retractor roll being attached on the opposite sides of the seat portion, both rolls being situated above respective parallel slide rails with the support pieces projecting under their respective parts of the parallel slide rails so that each of them is situated in the cross section of the slide rail at the same location as the sliding means attached to the seat portion and guiding the sliding movement of the seat.

6. A vehicle seat as claimed in claim 1, wherein the seat is equipped with a four point safety belt and comprises a further retractor roll for a second shoulder belt, said further retractor roll of the second shoulder belt being also attached to the frame of the horizontal seat part and having a support piece attached thereto, the retractor roll and the further retractor roll being attached on the opposite sides of the seat portion, both rolls being situated above respective parallel slide rails with the support pieces projecting under their respective parts of the parallel slide rails.

7. A vehicle seat as claimed in claim 6, wherein the parallel slide rails are attached in a stationary position to a vehicle floor.

8. A vehicle seat as claimed in claim 1, wherein the slide rail is attached in a stationary position to a vehicle floor.

* * * * *